United States Patent [19]
Miller

[11] 3,836,182
[45] Sept. 17, 1974

[54] PIPE COUPLING SYSTEM FOR GLASS OR CERAMIC PIPES AND RELATED MATERIALS

[75] Inventor: James G. Miller, Toledo, Ohio
[73] Assignee: Owens-Illinois, Inc., Toledo, Ohio
[22] Filed: Nov. 17, 1972
[21] Appl. No.: 307,584

Related U.S. Application Data
[63] Continuation-in-part of Ser. No. 64,386, Aug. 7, 1970, abandoned.

[52] U.S. Cl.................. 285/114, 285/369, 285/368
[51] Int. Cl........................ F16l 13/04, F16l 35/00
[58] Field of Search .... 285/369, 236, 233, DIG. 12, 285/373, 367, 368; 277/208; 285/114, 368, 412

[56] References Cited
UNITED STATES PATENTS

| | | | |
|---|---|---|---|
| 2,426,423 | 8/1947 | Woolsey | 285/233 |
| 2,717,273 | 9/1955 | Anderson | 277/208 X |
| 3,232,647 | 2/1966 | Kirchoff | 285/DIG. 12 |
| 3,235,293 | 2/1966 | Condon | 285/233 |
| 3,376,055 | 4/1968 | Donroe | 285/236 |
| 3,527,484 | 9/1970 | Waltden | 285/423 X |
| 3,558,164 | 1/1971 | Havell | 285/236 |
| 3,572,773 | 3/1971 | Read | 285/236 |
| 3,743,329 | 7/1973 | Wesel | 285/423 X |

FOREIGN PATENTS OR APPLICATIONS

| | | | |
|---|---|---|---|
| 1,100,861 | 9/1955 | France | 277/208 |
| 913,904 | 12/1962 | Great Britain | 285/DIG. 12 |

*Primary Examiner*—Geo. V. Larkin
*Attorney, Agent, or Firm*—J. R. Nelson; E. J. Holler

[57] ABSTRACT

A coupling system suitable for use with glass or ceramic pipes or pipes made of similar material used in the chemical processing industry, which includes an inner seal member or gasket at the junction of the pipes. The pipe ends may be straight cut or beaded or one of the pipe ends may be beaded and the other pipe end may be straight cut. A sleeve of molded elastomeric materials surrounds the center gasket inner seal which is provided with internal retaining means to retain the seal and which inner radial surfaces adjacent of the seal are provided with a plurality of radial slots to expose a plurality of non-molded ragged edges to the relatively smooth surface of the glass or ceramic pipe for maximum gripping action. A metal band or strap is placed around the elastomer sleeve and is clamped around the pipes and provided with tightening means. In the case of a dual coupling member, to be used for connection of unbeaded pipe ends or to adapt the system to high pressure use, axially extending tie rods are provided to transmit tensile forces from one coupling member to another, while the collar tightening means aids in compressing the elastomer sleeve or elastomer sleeves tightly against the exterior surfaces of the confined pipe ends in tight sealing contact with the inner seals or gasket.

14 Claims, 21 Drawing Figures

PIPE COUPLING SYSTEM FOR GLASS OR CERAMIC PIPES AND RELATED MATERIALS

RELATED APPLICATION

This application is a continuation-in-part application of my copending application for U.S. Pat. Ser. No. 64,386, filed Aug. 7, 1970, now abandoned.

BACKGROUND AND SUMMARY OF THE INVENTION

Pipe couplings are known to connect opposite pipe ends which include an inner seal and a metal strap placed around it to retain the inner seal at the junction of the pipe ends, the metal strap being provided with suitable torque adjustable tightening means to tightly clamp the metal strap around the inner seal at the junction of the pipe ends.

Such coupling arrangements are ordinarily designed for maximum speed of installation and to accommodate a variety of installation requirements in addition to being adaptable to be connected to standard ASA flanges.

These conventional pipe coupling systems are widely used for connection of pipes adapted to convey and transfer fluidic material. However, serious difficulties have been encountered to provide effective couplings for process pipes used in the chemical processing industry. These process pipes are adapted to carry high temperature fluids, particularly acids, alkali solutions and other organic and inorganic solvents.

These process pipes for the chemical processing industry are usually made of glass, ceramic or some other similar material adapted to withstand high temperature operating conditions and to resist corrosion and mechanical stresses.

One such material used for chemical processing pipes is known under the trademark "Cer-Vit" which is produced by Owens-Illinois, Inc.

These pipes made of "Cer-Vit" material have an excellent corrosion resistance to such chemical compounds as sulphuric acid, hydrochloric acid, nitric acid, phosphoric acid, acetic acid, ferric chloride, calcium hypochloride, hydrogen peroxide, sodium sulphite, sodium hydrochloride, and similar other compounds.

However, this material which is a ceramic-like compound, having high mechanical strength properties and permitting operation at higher pressures than other known non-metallic materials while withstanding abnormal temperatures and fluctuations in the pipe system pose certain problems in the field assembly of pipe sections. Some pipe sections are normally provided as prefabricated standard lengths, having integral radial beads at the end to accommodate the attachment of pipe couplings and, if such lengths must be saw-cut in the field to accommodate specific installation requirements, the beaded pipe ends have to be cut off and thereby provide square-cut pipe ends.

The conveying of chemical fluids of the kind above referred to at high temperatures and relatively high pressure, requires an effective seal at the pipe joint. This seal must be provided without sacrificing the necessary flexibility at the pipe joints and must accommodate small axial misalignments, slight differences in diameters and out-of-round shapes of the pipe ends, and at the same time must provide an effective seal to withstand the designed pressure and temperature ratings without the pipe ends being blown out of the coupling. Additionally, the pipe joints must have sufficient flexibility at the center line of the joint to (1) facilitate installation and (2) accommodate fluid surges causing pressure fluctuations.

It has been proposed heretofore to use an inner sealing gasket or synthetic material or the like, adapted to withstand high temperatures and pressures, positioned at the adjacent interfaces of the adjoining pipe ends and to surround the inner seal or gasket with a molded elastomeric sleeve provided with internal surfaces contoured to grab and retain the inner seal or gasket. The elastomer sleeve is provided with additional internal surfaces, adjacent the gasket, adapted to grip the surfaces of the pipe ends when the pipes are coupled together by the use of a metal band placed around the elastomer sleeve and tightened in place.

However, the gripping surfaces of the previously known elastomeric sleeves, adapted to grip opposed adjacent pipe ends, are integrally molded and thus provide smooth molded surfaces exposed to the similarly smooth glass or ceramic pipe surfaces. These molded surfaces are usually very slick and smooth resulting from the high polished surface of the mold or from the particular release agents used in the mold, and the mere fact that these gripping surfaces are integrally molded, considerably limits the co-efficient of friction between the internal surfaces of the molded elastomer sleeve and the radial surfaces of the ends off the opposed pipes, which present smooth and highly polished surfaces.

To overcome this disadvantage, it has further been proposed to incorporate separate side seal band clamps which, however, must be provided with beads, grooves, ribs or other such mechanical configuration, adapted to create interference in the direction of force tending to blow the pipe end out of the coupling. These separate side seal band clamps and associated elastomeric sleeves and gasket seal at the intermediate center of the joint must have matching configurations to create an interference fit, but these are difficult and costly to produce.

In addition, when conventional pipe couplings are used in conjunction with the above side seal principle to connect square cut pipe ends, that is, pipes which do not have integral beads at the end, serious leaking problems are encountered when the pipe is flexed under fluid pressure.

The present invention provides an improved coupling system for pipe ends made of glass, ceramic or other similar material, regardless of whether both ends are beaded, or just one pipe end is beaded and the other pipe end is square-cut, or both pipe ends are square-cut.

This is accomplished by the incorporation of a sealing gasket between the immediate adjoining ends of the opposed pipes which is made of a synthetic material such as Teflon, Hypalon, Viton or the like. The sealing gasket has contoured axially extending radial flanges extending over the adjoining pipe ends provided with end seal configurations which are shaped so as to snap over the head of the pipe end — if such is provided — or to cooperatively engage matching internal configurations provided in the elastomeric sleeve surrounding the center sealing gasket.

The improved elastomeric sleeve used in conjunction with the improved coupling assembly of the present invention is specifically adapted for use around an extremely smooth surface of a pipe made of a material such as glass, ceramic or the like, to considerably increase the gripping action of the elastomer sleeve on the pipe ends by using customary pipe clamps such as an iron or steel band having pivotal, tangential clamping rods to tighten the steel band around the elastomeric sleeve, to thereby secure the opposed adjacent pipe ends together. The present improved elastomer sleeve for a pipe coupling is provided with contoured internal surfaces, such as spaced radial grooves or ribs, adapted to engage mating external radial contours provided on the inner sealing gasket so that, when the elastomer sleeve is compressed around the pipe ends by means of an external steel band clamp, a tight end sealing contact will be provided between the inner seal and the elastomer sleeve adjacent the interfaces of the axially aligned opposed pipe ends. Additionally, the improved intermediate elastomer sleeve is internally radially circumferentially slitted at spaced distances and substantially along the entire length of the portion of the elastomer sleeve which radially contacts the external surfaces of the pipe ends to thereby considerably increase the gripping action of the elastomer sleeve on the pipe ends by exposing a non-molded surface to the relatively smooth pipe surfaces.

As mentioned before, the elastomer sleeve of the improved coupling system of the present invention is molded from an elastomer material such as Viton, Neoprene, Buna "N" or the like. Molded parts, particularly if made from synthetic material present an extremely slick, highly polished, external or internal surface due to the polished surface of the mold or, respectively, due to the particular release agents used in the mold. Thus, any such molded surfaces, in the form of internal gripping ribs or grooves commonly provided with the goal of increasing the co-efficient of friction between the elastomer sleeve and the external surface of the member or members around which the sleeve is disposed actually reduces the co-efficient of friction. This conventional arrangement may be sufficient in conjunction with metal pipes having unfinished, relatively rough surfaces or pipes made of other materials providing relatively rough external surfaces. However, for the use in, or in conjunction with, glass or ceramic pipes or pipes of similar material, which are usually extrusion molded to present an extremely smooth, external surface, the conventionally integrally molded gripping ribs or grooves provided in the elastomer sleeve of a conventional coupling, considerably limit the co-efficient of friction between the elastomer sleeve and the smooth external surfaces of the glass or ceramic pipes.

Accordingly, the improved elastomer sleeve of the present invention is provided with a plurality of internal radial slits substantially equally spaced along the axial length of the sleeve and which are provided with a mechanical operation rather than by an integral molding process, to thereby provide presentation of non-molded surfaces in contact with the smooth external surface of the pipe. In addition, the mechanical slitting operation, to provide internal radial slits in the present improved elastomer sleeve, considerably reduces scrap in the molding operation and prevents the tear-out of fragile ribs formerly provided by an integral molding process, when the part is extracted from the mold.

As referred to earlier, the assembly of the present improved pipe coupling system is completed by the provision of an external steel band disposed around the elastomer sleeve, which has radial clamping provisions to tightly clamp the steel band around the elastomer sleeve for compression of the elastomer sleeve against the external surfaces of the pipe ends. As also previously mentioned, the present improved pipe coupling system can be advantageously used with prefabricated lengths of pipe in which both ends are provided with radial beads or, where one prefabricated section of pipe is provided with a radial bead and another section of pipe is saw-cut or, with two opposed saw-cut sections of pipes as is frequently encountered in field installation requirements.

In the latter instance, preferably a plurality of pairs of oppositely directed tie rods are used, extending in axial direction along the pipe and spaced around the improved pipe coupling at equally, angularly spaced distances, which, when tightened, exert a force in opposite directions to draw the two sections of pipe ends together to maintain the coupling connection by means of the gripping action of the slitted elastomer sleeve surrounding the pipe ends.

In the other instance, where only one pipe end is saw-cut and the other pipe end is provided with an integral bead, only one axial tie rod is employed at each radial location around the improved pipe coupling. This tie rod, by exerting a force when tightened, in a direction towards the beaded pipe end, resists separation of the saw-cut pipe end from the inner flange of the inner seal disposed between the adjoining pipe ends.

Obviously, if both pipe ends are provided with integral radial beads disposed in opposed adjacent relationship, no axial tie rods will be necessary to draw the two pipe ends together against the inner seal, this function being provided by compression of the intermediate elastomer sleeve disposed between the external steel clamping band and the pipes.

Additional features and novel advantages of the present improved pipe coupling system will become evident or particularly be pointed out by the following detailed description in connection with the appended drawings illustrating several preferred embodiments of the invention.

BRIEF DESCRIPTION OF THE DRAWINGS

The accompanying drawings illustrate several preferred embodiments of the present improved pipe coupling system, in which.

DESCRIPTION OF THE PREFERRED EMBODIMENTS

With continuing reference to the drawings and particularly FIGS. 1 through 5, this embodiment of the present improved pipe coupling system is adapted to flexibly connect the ends of two saw-cut pipes 10 and 12 together and provide an effective sealing connection between the pipe ends.

Figure 4:
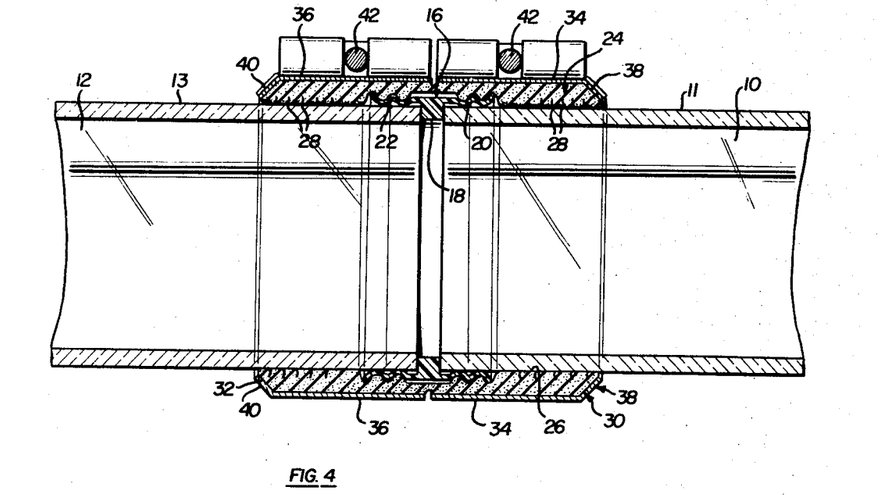
FIG. 4 is a longitudinal cross-section through the improved pipe coupling assembly shown in FIG. 1.

As seen in FIG. 4, the ends of the pipes 10 and 12 are square-cut as often required in field installations where the pipes have to be cut to a required length at the place of installation. The pipes 10 and 12 are chemical processing pipes adapted to carry chemical fluids at high temperatures and sometimes at high pressure. Thus, the pipes 10 and 12 are made of a material which is highly corrosion and temperature resistant, such as glass, synthetic or natural, ceramics or other related materials and, in this particular instance, the pipes 10 and 12 are made of a glass-like material known under the trademark "CER-VIT" produced by Owens-Illinois, Inc. These pipes have an extremely slick and smooth external surface which, in the past, made it difficult to provide an effective coupling and seal for the adjoining pipe ends.

In the present invention, the improved pipe coupling system 14 includes an inner seal 16, as seen in FIG. 4, which is a cylindrical member having an intermediate radially inwardly extending flange portion 18 adapted to be disposed between the adjoining end faces of the pipes 10 and 12.

The inner seal 16 is formed with cylindrical end portions 20 and 22 which axially extend in opposite directions from the intermediate flange or gasket portion 18. Cylindrical portions 20 and 22 are radially contoured to provide alternate grooves and ribs adapted for circumferential sealing contact around and against the adjoining outer surfaces 11 and 13 of the pipes 10 and 12.

The inner seal 16 is preferably made of a synthetic material such as Teflon, or the like, having high temperature pressure and wear resistance properties and which is unaffected by the chemical compounds conveyed through the pipes 10 and 12, particularly acids, alkali solutions and organic or inorganic solvents.

The inner seal 16 is retained in place around the adjoining pipe ends and in sealing contact against the radial outer surfaces, and opposite lateral end surfaces of the pipe by means of a resiliently compressible collar or sleeve 24 which is of an axial length to extend beyond the cylindrical end seal portions 20 and 22 of the inner seal 16 to be in contact with the surfaces 11 and 13 of the pipes 10 and 12.

Figure 5:
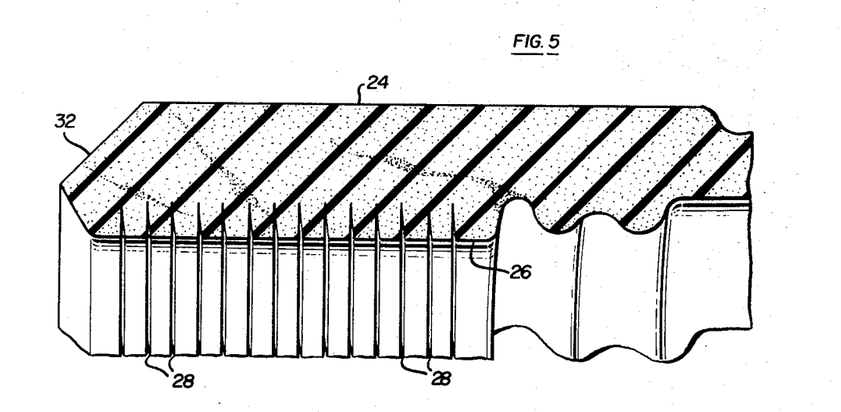
FIG. 5 is an enlarged fragmentary cross-section in longitudinal direction through one of the improved elastomer sleeves used in the pipe coupling assembly shown in FIGS. 1 to 4.

With particular reference to FIGS. 4 and 5, the resiliently compressible collar or sleeve 24 is preferably made of an elastomer material such as rubber, Neoprene, buna "N," or the like and comprises a generally cylindrical body having an axial bore 26 of somewhat smaller diameter than the external diameter of the pipes 10 and 12. Internally, at the center of the compressible sleeve 24, the sleeve 24 is provided with circumferential configurations providing alternate internal grooves and ribs adapted to engage with the alternate groove and rib configurations provided on the opposed cylindrical end seal portions 20 and 22 of the inner seal 16 as shown in FIG. 4.

Since the compressible sleeve 24 is conventionally made by a molding process, the internal bore surface 26 of the sleeve 24 is normally very smooth and has a polished appearance and, if placed in contact with the external surfaces 11 and 13 of the pipes 10 and 12, which, by themselves, are likewise very smooth and polished due to the particular molded material of which the pipes are made. Frictional contact between the internal surface 26 of the sleeve 24 and the outer surfaces of the pipes 10 and 12 would be less than desirable, even if the compressible sleeve 24 would be tightly clamped around the pipe ends causing the pipe ends, under high fluid pressure and fluctuation to be blown out of the coupling assembly 14.

In view of these considerations, the compressible sleeve 24 of the present improved pipe coupling assembly 14 is provided with a plurality of substantially equally spaced, internal, circumferentially extending slots 28 in both cylindrical portions of the sleeve. The internal slots 28 cut through the bore surface 26 of the compressible sleeve 24 and are preferably made by a separate machining operation after molding of the compressible sleeve 24. In other words, these slots 28, are not integrally molded as are the alternate grooves and ribs at the center portion of the sleeve. Thus, if the slots 28 are opened up by means of axial and radial compression forces on the compressible sleeve 24, a plurality of non-molded surfaces will be exposed which are considerably rougher in texture than the molded internal surface 26 of the sleeve 24. Thus, the plurality of non-molded surfaces exposed by opening up of the slots 28 within the sleeve 24, when compressed around the adjoining pipes 10 and 12, provide a sufficiently high frictional engagement between the compressible sleeve 24 and the pipe ends to effectively prevent the pipe ends from being blown out of the coupling assembly.

The outer ends of the compressible sleeve 24 are chamfered as seen at 30 and 32, respectively, for a purpose to appear.

The assembly of the improved pipe coupling system 14 as illustrated in FIGS. 1 to 5, is adapted to seal and connect two unflanged square-cut pipe ends, as seen in FIG. 4, by the provision of a pair of metal band clamps 34 and 36 provided for circumferential engagement around the compressible sleeve 24 in coaxially aligned, adjoining relationship. Each of the band clamps 34 and 36 at their outwardly opposed ends is provided with an inwardly inclined flange portion 38 and 40 respectively, which are adapted to engage the externally chamfered end portions 30 and 32 of the compressible sleeve 24 to thereby axially and radially retain the sleeve within the two adjoining band clamps 34 and 36.

Figure 1:
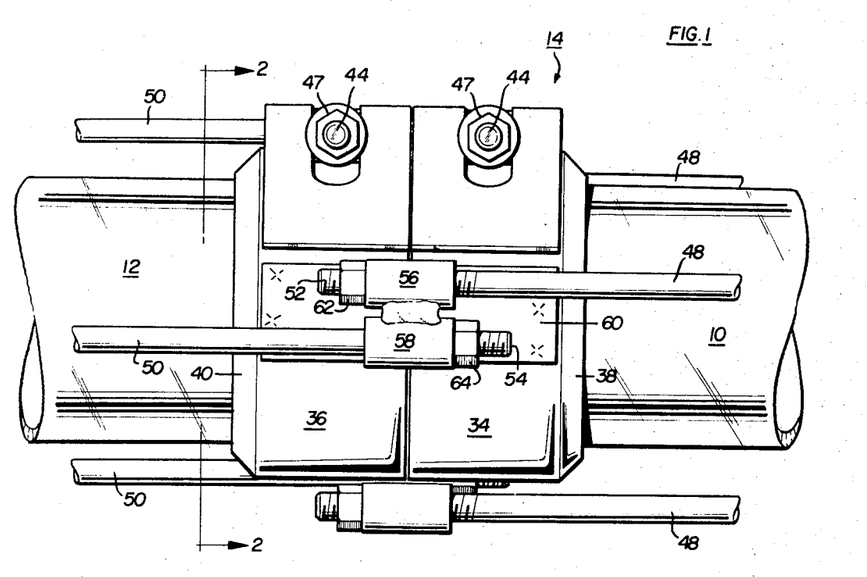
FIG. 1 is a longitudinal side view of one form of the present improved pipe coupling system used in conjunction with unflanged pipe ends.
Figure 2:
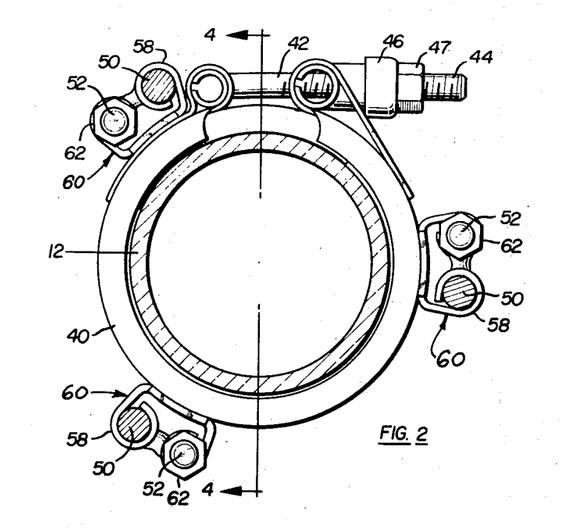
FIG. 2 is a transverse cross-section through one pipe end adjacent the improved pipe coupling assembly shown in FIG. 1 and as seen in the direction of the arrow 2—2.
Figure 3:
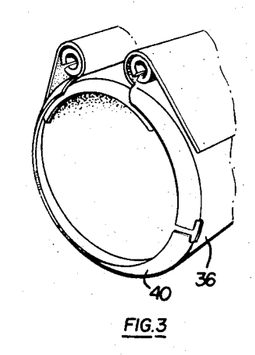
FIG. 3 is a partial perspective illustration of the external metal band used in the pipe clamping assembly of FIG. 1.

As more clearly seen in FIGS. 1 and 2, each of the adjoining band clamps 34 and 36 is provided at one end with a pivotal rod 42 which has a threaded end portion 44 adapted for extension through a fitting 46 pivotally secured to the other end of each of the metal band clamps 34 and 36. Thus, in the assembly as seen in FIG. 2, the threaded end 44 of the pivoted rod 42 will be inserted through the likewise pivoted fitting 46 for extension therethrough. Thereafter, a tightening nut 47 is threaded over the threaded end 44 into abutment against the fitting 46 to draw the opposed ends of the band clamp together along the rod 42, which extends in a substantially tangential direction relative to the cylindrical configuration of the band clamps.

With continued reference to FIGS. 1 and 2, in this embodiment of the invention, which is used to connect square-cut pipe ends, a plurality of paired tie rods 48 and 50, respectively, are provided, which extend externally axially along the pipes 10 and 12. Each pair of tie rods 48 and 50 is paired to extend in opposite directions. Thus, all of the tie rods 48 are disposed in a direction along the pipe 10, and all of the tie rods 50 are disposed to extend in a direction along the pipe 12. Each of the tie rods 48 and 50 is provided with a threaded end portion 52 and 54, respectively, adapted for extension through parallel disposed opposite ears 56 and 58 which are integrally formed at the center of a bracket 60, spot welded to both band clamps 34 and 36.

The brackets 60 are disposed around the band clamps 34 and 36 at equally angularly spaced distances, as seen in FIG. 2, and the tie rod receiving ears 56 and 58 are disposed such as to be in the center of the assembly overlapping the adjoining ends of the band clamps 34 and 36. The opposite ends of each of the tie rods 48 and 50 are suitably secured to a stationary member, as described below, normally utilized in a pipe installation of this kind.

In assembly, the oppositely directed pair of tie rods 48 and 50 are inserted from opposite directions through the adjoining pair of ears 56 and 58 and their threaded ends 52 and 54, respectively, each receive a tightening nut 62 and 64.

A radial compression force of a predetermined magnitude is exerted on the compressible elastomer sleeve 24 by means of the clamp rods 42 when the nuts 47 are tightened against the pivotal fittings 46 of each of the band clamps 34 and 36.

Due to the radial and axial compression force exerted on the elastomer sleeve 24, the plurality of internal slots 28, normally disposed in parallel planes and intersecting the central axis of the sleeve 24 at a right angle, are being displaced axially outwardly to open up and thereby expose a plurality of unmolded surfaces in tight sealing and gripping engagement with the smooth external surfaces 11 and 13 of the adjoining pipes 10 and 12. The gripping action of the internal slots 28 retains the lateral end surfaces of the adjoining pipes in tight sealing engagement against the central flange 18 of the inner sealing member 16. At the same time, the contoured internal surfaces centrally of the sleeve 24 are being compressed into tight sealing engagement against the similarly contoured cylindrical end seal portions 20 and 22 of the inner sealing member 16 for the adjoining pipe ends, preventing the escape of any fluids carried by the pipes through the joint.

It will be appreciated from the foregoing description that due to the flexibility of the material and the particular construction of the elastomer sleeve 24, small axial misalignments between the pipes 10 and 12 are easily accomodated for, as well as out-of-round conditions of the pipe ends or small differences in pipe diameters as conventionally encountered considering permissible manufacturing tolerances. At the same time, it will be appreciated that the present improved coupling assembly 14 permits and accommodates a relatively large latitude of flexing at the pipe joint without sacrificing its effective sealing characteristic as well as its gripping capacity on the pipe ends.

Figure 6:
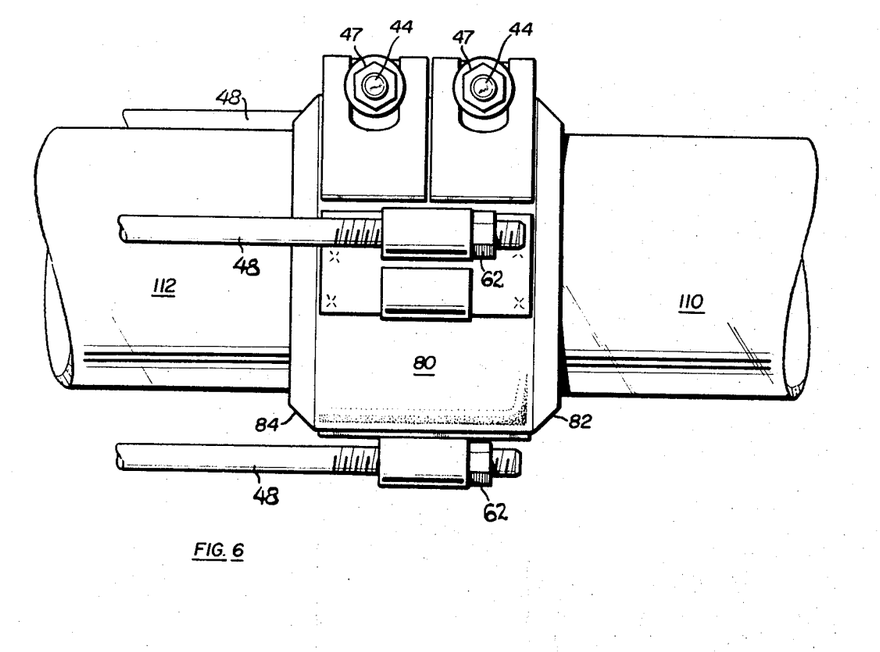
FIG. 6 is a further embodiment of the present improved pipe coupling system adapted for use with one non-flanged pipe end and one flanged pipe end.
Figure 7:
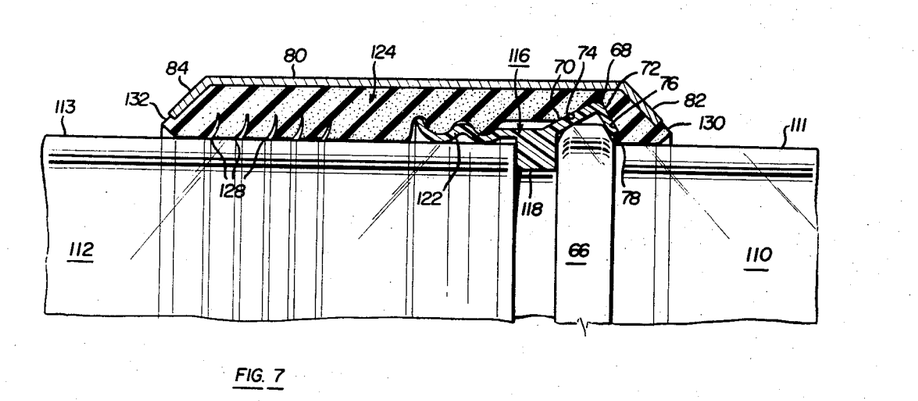
FIG. 7 is an enlarged partial longitudinal cross-section through the improved pipe coupling system shown in FIG. 6.

Referring now to the embodiment illustrated in FIGS. 6 and 7, parts similar or equivalent to parts of the embodiment of FIGS. 1 to 5 will be designated by the same reference numerals with a prefix 1 added.

The tube coupling embodiment of FIGS. 6 and 7 is utilized for sealing connection of a beaded and a saw-cut pipe in distinction over the embodiment in FIGS. 1 to 5 used for connection of square-cut pipe ends.

One pipe 110 is prefabricated and provided with an integral bead 66, whereas the axially aligned opposite pipe 112 has a square-cut end as provided in field installations. The inner sealing member 116, in this instance, has a similar radially inwardly extending flange or gasket portion 118, adapted for insertion between the opposed pipe ends, and an axially extending radially contoured end seal portion 122, similar to the end seal portion 22 in FIG. 4, which extends over the saw-cut end of the pipe 112 in sealing contact against the pipe surface 113. From the opposite side of the intermediate flange or gasket portion of the inner seal 116 extends another, dissimilarly shaped end seal portion 68 which is shaped to provide a first, radially outwardly inclined section 70 joined by a second inwardly inclined section 72 to thereby provide a rim like shape, adapted to be snapped over the head 66 of the adjoining pipe 110.

To retain the inner seal 116 in position between and around the ends of the pipes 110 and 112, a compressible elastomer sleeve 124 is provided which, at one side of the center line of the joint, is internally shaped similarly to the elastomer sleeve 24 in FIG. 4. Thus, the internal surface of the elastomer sleeve 124 adjacent the center of the joint is radially contoured to match the contours of the cylindrical end seal portion 122 of the inner seal 116 which extends over the saw-cut pipe end 112, adapted to be compressed in sealing contact against the pipe surface 113, is provided with a plurality of substantially equally spaced, internal, radial slots 128 to present unmolded surfaces to the smooth surface 113 of the pipe, when the elastomer sleeve is compressed around the pipe joint.

The other end of the elastomer sleeve 124 which extends over the bead 66 of the flanged pipe 110 is substantially shorter in axial length for a reason to appear, and is provided internally with oppositely inclined surfaces 74 and 76, respectively, substantially matching the rim like end seal portion 68 of the inner seal 116 for close abutting engagement therewith. The inner end, adjacent the inclined surface 76, is formed into an internal radial ledge portion 78 adapted for compressible abutment against the bead 66 of the tube 110 immediately adjacent where the bead joins the external surface 111 of the tube. The internal radial ledge portion 78 of the elastomer sleeve 124 provides a seating means for the edge of the inwardly inclined outer rim portion 72 of the end seal portion 68 of the inner seal 116 so that the material of the elastomer sleeve 124, in assembly, completely surrounds and protects the inner seal 116 against external contamination and from displacement during assembly of the end 66 into the seal 116.

In assembly, the elastomer sleeve 124 is axially and radially compressed in tight sealing engagement around the inner seal 116 and the adjoining pipe ends of the square-cute pipe 112 and the beaded pipe 110 by means of a metal clamp band 80. The metal clamp band 80 is of a substantially cylindrical configuration and provides inwardly directed end flanges 82 and 84, respectively, adapted to radially engage the chamfered ends 130 and 132 of the elastomer sleeve 124. Thus, the elastomer sleeve 124, in assembly, is axially and radially retained within the band clamp 80.

Similarily, as in the embodiment of the improved coupling assembly in FIGS. 1 to 5, a pair of clamp rods are provided, externally of the band clamp 80, which are pivoted to one end of the band clamp and which threaded end portions 44 are adapted for insertion through fittings 46 pivoted to the other end of the band clamp 80. For securement of the band clamp 80 around the elastomer sleeve 124 nuts 47 are provided to be tightened at a predetermined torque against the fittings to thereby radially compress the elastomer sleeve 124 against the pipe surfaces 111 and 113 and around the contoured end seal portions 122 and 68 of the inner seal.

Since only one pipe end, i.e., 112, is square-cut, only one group of tie rods 48 is necessary in this embodiment, which extend in a direction away from the beaded pipe 110 so that, upon tightening of the nut 162 against the ear 156 which retains the threaded end of the tie rod 48 on the band clamp 80, the elastomer sleeve 124 will be subjected to a compression force in axial direction, towards the pipe 112, to thereby displace and open the slots 128 internally of the elastomer sleeve to present unmolded surfaces to the smooth surface 113 of the saw-cut pipe 112 in order to establish sufficient frictional contact between the elastomer sleeve 124 and the saw-cut pipe end 112 to securely retain the saw-cut pipe end in the coupling assembly. The other end of the elastomer sleeve 124 disposed around the bead 66 of the pipe 110 is subject only to a radial compression force to tightly compress that end of the elastomer sleeve 124 around the rim-like end seal 68 of the inner seal 116 and in tight sealing engagement with the surface 111 of the pipe 110 adjacent the bead 66.

Figure 8:
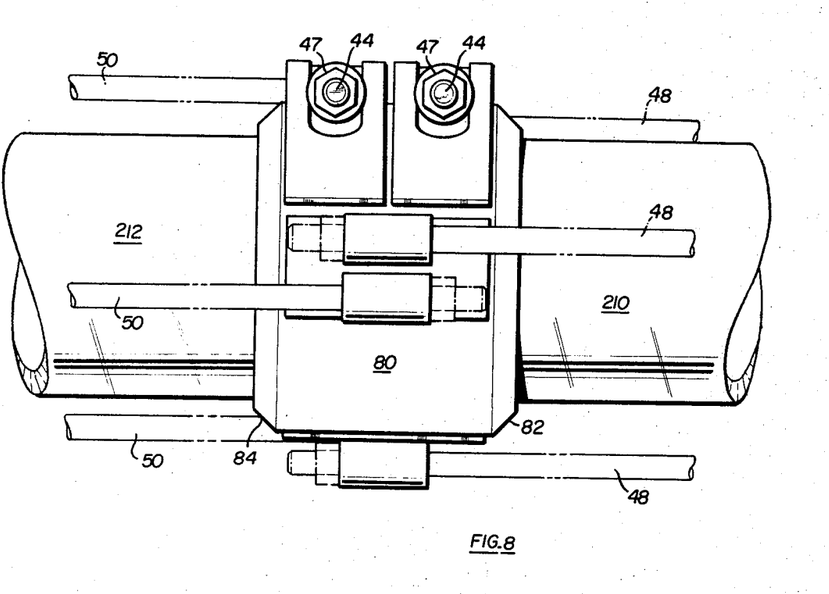
FIG. 8 illustrates a further embodiment of the present improved pipe coupling system adapted for use for pipe ends in which both are being provided with radial flanges.
Figure 9:
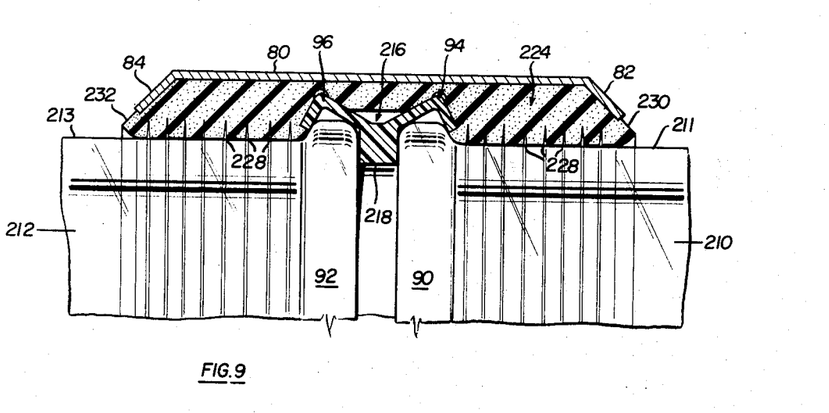
FIG. 9 is an enlarged fragmentary longitudinal cross-section of the embodiment of the improved pipe coupling system illustrated in FIG. 8.

With reference now to the embodiment illustrated in FIGS. 8 and 9, similar or equivalent parts are designated by the same reference numerals with the prefix 2 added.

The embodiment of the improved pipe coupling illustrated in FIGS. 8 and 9 is utilized in connection with the securing of prefabricated pipe ends, made of a material referred to in the foregoing and both of which are provided with integral beads.

As seen in the drawings, there is shown a pipe 210 which is prefabricated to a predetermined length and which is provided with an end bead 90 and an opposed, axially aligned pipe 212 similarly prefabricated and provided with an end bead 92 axially opposing the end bead 90 of the adjoining pipe 210.

The coupling assembly comprises an inner seal member 216 which, similarly, as in the previously described embodiments, is provided with an internal radial flange or gasket portion 218 adapted for insertion between the opposed end bead portions 90 and 92 of the adjoining pipes. The inner seal 216 has axially extending, opposed end seal portions 94 and 96, which axially extend from the inner flange or gasket portion 218 in both directions to overly the opposed beads 90 and 92 of the adjoining pipes. The end seal portions 94 and 96 of the inner seal 216 are shaped similarly to the end seal portion 68, shown in the embodiment in FIG. 7, each of which providing outwardly and inwardly inclined radial surfaces to assume a rim like configuration adapted for snap-over engagement over their respective adjacent bead 90 or 92. The end seal portions 94 and 96 are somewhat resilient in axial as well as in radial direction to permit tight snap-over engagement over the adjoining beads 90 and 92 of the pipes 210 and 212.

In order to maintain the inner seal 216 in place, between and around the adjoining end flanges 90 and 92 of the pipes and to provide a fluid tight flexible coupling assembly, a compressible elastomer sleeve 224 is provided which is similar in configuration to the elastomer sleeve 24 in the embodiment of FIGS. 1 to 5. The elastomer sleeve 224 is of an axial length to substantially extend in both directions beyond the adjoining pipe beads 90 and 92 to provide adequate area contact around the opposed external smooth surfaces 211 and 213 of the adjoining pipes 210 and 212.

The elastomer sleeve 224 has an internally contoured central portion surrounding the inner seal 216 with inclined surfaces substantially corresponding to the oppositely inclined surfaces of the end seal portions 94 and 96 for complete surrounding, sealing engagement thereagainst. The opposed cylindrical end portions of the elastomer sleeve 224 which are adapted to extend over portions of the adjoining pipes 210 and 212, immediately adjacent the respective beads 90 and 92, are each provided with a plurality of internal radial slots 228 similar to the embodiment shown in FIGS. 4 and 5.

The elastomer sleeve 224, as in the other embodiments, is a molded article and thus normally would expose smooth surfaces having a polished appearance which, normally, would not provide sufficient frictional contact with the smooth polished surfaces 211 and 213 of the pipes to provide adequate gripping engagement to retain the pipe ends in sealing position against the inner seal 216. By the provision of the internal radial slots 228 in both cylindrical ends of the elastomer sleeve 224 adjacent the center portion, non-molded surfaces will be exposed to the smooth surfaces 211 and 213 of the pipes when the elastomer sleeve is compressed around the pipe joint in tight engagement with the inner seal and the pipe surfaces.

In order to retain and clamp the elastomer sleeve 224 around the adjoining pipe ends and the inner seal 216, a metal band clamp 80 is provided which is identical to the band clamp 80 in the embodiment illustrated in FIGS. 6 and 7. Thus, the band clamp 80 is composed of a substantially cylindrical body having inwardly directed inclined end flanges 82 and 84 respectively, adapted to radially engage the opposed chamfered outer surfaces 230 and 232 at both ends of the elastomer sleeve 224 to thereby radially and axially confine the elastomer sleeve within the band clamp 80. Similarly, as in the FIGS. 6 and 7 embodiments, the band clamp 80 is provided with a pair of tie rods, as more fully described below, pivotally secured to one end of the band clamp adjacent each other which have an end adapted for extension through identical fittings pivotally secured to the opposite end of the band clamp 80. To tighten the band clamp 80 around the adjoining beaded pipe ends and the inner seal 216, each of the threaded ends of the tightening rods is provided with a lock nut 47 adapted to be tightened against its respective fitting to thereby radially clamp the clamp 80 around the adjoining pipe ends and inner seal 216. By application of a predetermined clamping torque, the band clamp 80 radially and axially compresses the elastomer sleeve 224 into tight sealing engagement against the inner seal 216 and in tight clamping engagement around portions of the pipe surfaces 211 and 213 adjacent the respective opposed beads 90 and 92, to thereby retain the beaded pipes in tightly sealed coupling engagement with each other. As herebefore described, compression of the elastomer sleeve 224 by means of the band clamp 80 causes displacement of the internal radial slots 228 in the elastomer sleeve to expose unmolded, substantially rough textured surfaces to the relatively smooth surfaces 211 and 213 of the adjoining pipes 210 and 212 for maximum frictional gripping engagement therewith, to prevent either pipe end from being blown out of the coupling assembly due to pressure of the fluid conveyed through the pipes 210 and 212. The details of the rod connections and fittings are best shown in FIGS. 1 to 5.

Since, in the embodiment of FIGS. 8 and 9, both pipe ends are provided with beads adapted to be in snap-over engagement within the opposed end seal portions 94 and 96 of the inner seal 216, the axial tie rods would not be necessary to retain the adjoining pipe ends in coupling engagement.

However, the band clamp 80 in the FIGS. 8 and 9 embodiments, used for connection of beaded pipe ends is likewise provided with brackets spaced at equal distances radially around the band clamp, each of which having upstanding ears for reception and securement of pairs of axial tie rods 48 and 50 respectively, if such must be used, as indicated in dot-and-dash lines in FIG. 8.

The elastomer sleeve, in each of the embodiments described herein, is preferably molded from a rubber compound such as known under the name of Viton, Neoprene, Buna "N," or the like, having a durometer hardness of about 75 to 80 "A" scale and an average tensile strength of 2,000 PSI. The material of the compressible sleeve is compounded for maximum chemical ozone resistance having a maximum tear strength and a compression-set ratio of about 20 to 25 percent.

As mentioned before, the elastomer sleeve used in the improved pipe coupling system disclosed above is a molded article and the provision of radial slots through the smooth internal surfaces of the elastomer sleeve considerably increases the coefficient of friction between the sleeve and the associated pipe ends which, by themselves, have very smooth and slick surfaces in view of particular glass or ceramic material of which these process pipes are made.

Figure 10:
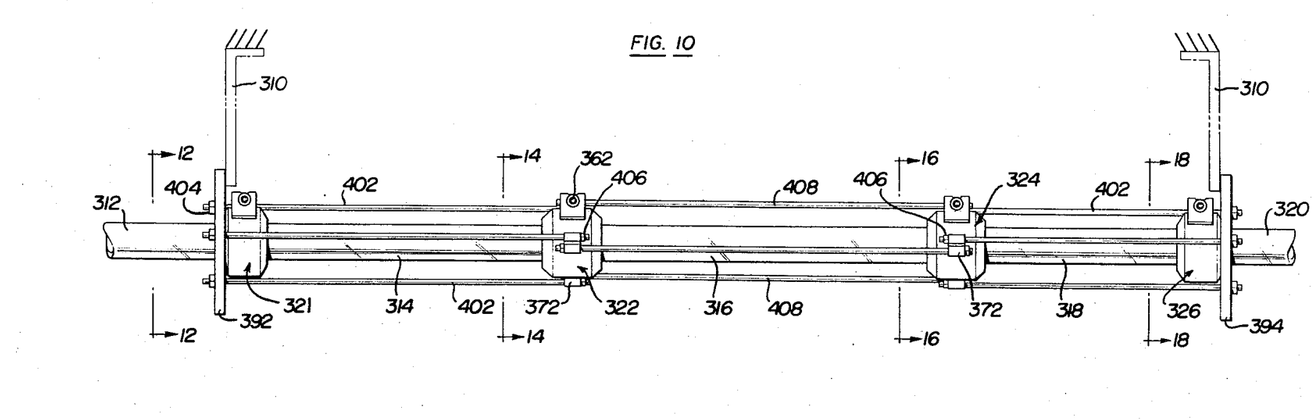
FIG. 10 is a longitudinal side view of a complete coupling system utilizing the structural elements of this invention.
Figure 19:
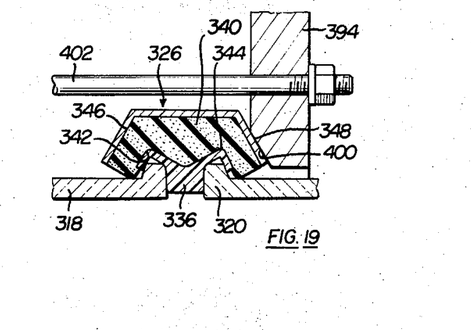
FIG. 19 is a cross-sectional view of the coupling shown in FIG. 18, in the direction of view arrows 19—19.

The pipe coupling system shown in FIG. 10 illustrates one installation utilizing the coupling system described above to sealingly retain a plurality of glass or ceramic pipes. The installation is suitable for either horizontal or vertical pipe sections. The installation is supported on structural elements 310, as will be described below. The system includes a plurality of glass or ceramic pipes 312, 314, 316, 318 and 320. The pipes are secured in sealing relation by couplings 321, 322, 324 and 326. Each of the couplings includes an inner seal, a compressible sleeve and a metal band clamp or strap 360, as described below. The pipe sections 312 and 314 each include a flange or bead 328, 330, respectively, and therefore the inner seal 332 includes a pair of resilient rim or hook-shaped portions 334 to receive the beaded pipe ends, as described above and shown in FIG. 13. The inner seal 336, between beaded pipe sections 318 and 320, may be identical, as shown in FIG. 19. The compressible seal or collar 338 encloses the inner seal, as described above. The configuration of the seal in the coupling 321 may be described with reference to FIG. 19 because the sleeve 340 may be identical. The sleeves in the pipe coupling system shown in FIGS. 10 and 11 have been modified somewhat from the sleeves 24, 124 and 224 described above. The sleeves utilized in this embodiment of the pipe coupling system do not include the laterally extending portions including the slits described above. The sleeve in this embodiment is preferably formed of a relatively resilient material, as described above, and is configured to receive the inner seal. It has been found that in certain applications the laterally extending portion is not required. The resilient sleeve or collar 340 shown in FIG. 19 includes a pair of configured molded annular channels 342 which receive the arms 344 of the inner seal. The opposed sides are chamfered at 346 to conform to the angular sides 348 of the band clamps. In the embodiment of the couplings 321 and 326 shown in FIGS. 12, 13, 18 and 19, the tie rods are not connected directly to the band clamps or straps, but are connected to a metal plate, as described below.

Figure 14:
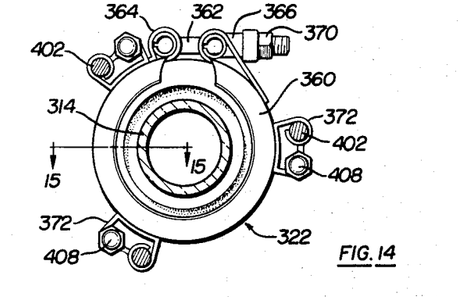
FIG. 14 is a cross-sectional end view of the pipe coupling system shown in FIG. 10, in the direction of view arrows 14—14.
Figure 15:
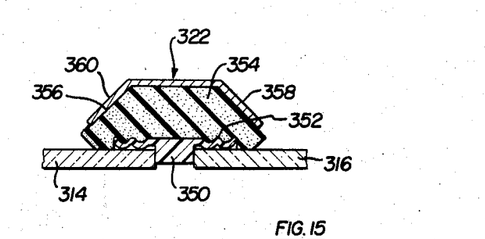
FIG. 15 is a cross-sectional view of the coupling shown in FIG. 14, in the direction of view arrows 15—15.

The inner seal 350 in the coupling 322 shown in FIGS. 14 and 15 is adapted to seal a pair of saw-cut pipes, as shown in FIG. 15. The cylindrical portions 352 of the inner seal are therefore ribbed, as described above, and the compressible sleeve 354 includes a plurality of molded rib portions which receive the ribbed cylindrical portions 352 and aid in the retention of the inner seal 350. The opposed sides of the sleeve are chamfered, as shown at 356 to receive the angular side portions 358 of the band clamp 360, as described above.

The band clamp 360 shown in FIG. 14 may be similar to the clamps described above, except that the width has been reduced by reducing the width of the compressible sleeve 354 and the utilization of a single pivot rod 362, as shown in FIGS. 10 and 14. The rod 362 is pivotally secured at one end 364 of the band clamp and is received in a fitting 366 secured to the opposite end of the clamp, as described in regard to FIG. 2, above. The band clamp is securely retained in place by a nut 370. Three equally spaced tie rod brackets 372 are secured to the band clamp, as described above and shown in FIG. 16.

Figure 16:
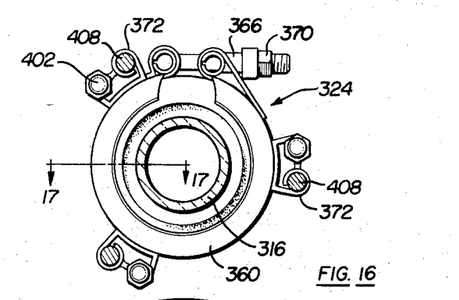
FIG. 16 is a cross-sectional end view of the pipe coupling system shown in FIG. 10, in the direction of view arrows 16—16.
Figure 17:
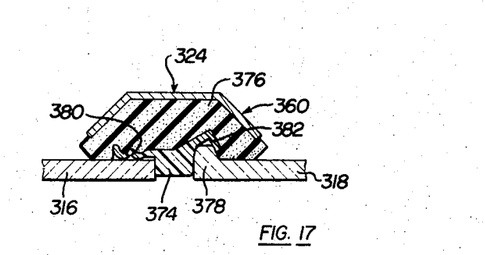
FIG. 17 is a cross-sectional view of the coupling shown in FIG. 16, in the direction of view arrows 17—17.
Figure 18:
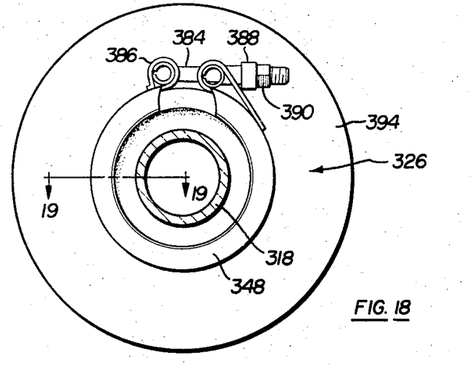
FIG. 18 is a cross-sectional end view of the pipe coupling system shown in FIG. 10, in the direction of view arrows 18—18.

The coupling 324, shown in FIGS. 16 and 17, also includes an inner seal 374, a compressible sleeve or collar 376 and a band clamp which has been numbered 360 because it may be identical to the band clamp 360 shown in FIGS. 14 and 15. In this embodiment, one of the pipe sections 316 has a saw-cut end and the opposite pipe 318 is beaded, as shown at 378. The inner seal 374, therefore, includes a ribbed cylindrical portion 380, which sealingly retains the saw-cut end of the pipe section 316 and a hook-shaped portion 382 which receives the beaded end 378 of the pipe section 318. The molded inner side of the annular sleeve 374 is configured to receive the laterally extending portions 380 and 382, as described above. The band clamp 360 has also been numbered to correspond to the band clamp in FIG. 14.

Figure 12:
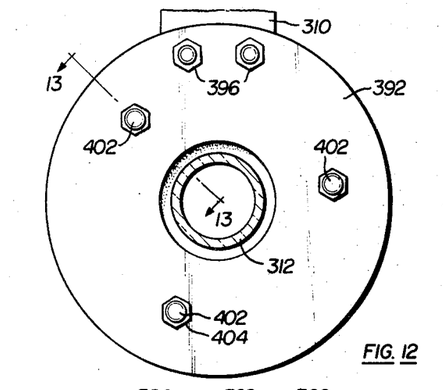
FIG. 12 is a cross-sectional view of the pipe coupling system shown in FIG. 10, in the direction of view arrows 12—12.
Figure 13:
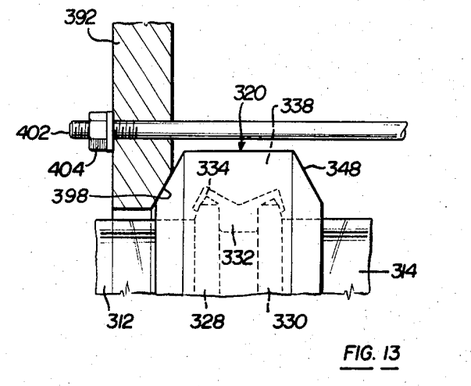
FIG. 13 is a cross-sectional view of FIG. 12, in the direction of view arrow 13.

As described above, the band clamp 348 in FIG. 18 may be identical to the band clamp shown in FIGS. 12 and 13 and includes a pivot rod 384 secured to one end 386 of the band clamp, which is received in a fitting 388 secured to the opposite end of the clamp. A threaded nut 390 bears against the fitting 388, tending to close the ends of the band clamp and securely retaining the coupling in place.

The tie rod assembly is best shown in FIG. 10 and includes a pair of end plates 392 and 394 which bear against the outside couplings 321 and 326, respectively. The end plates are secured to the stationary supports 310 by bolts 396, or the like. The tie rods extends parallel to the axis of the pipe sections and the couplings and are tensioned in opposite directions, as described above, to radially and axially compress the elastomeric sleeves and improve the retention and sealing provided by the couplings.

The end plates 392 and 394 each include a bevelled edge 398 and 400, respectively, which bears against the angular or tapered sides 348 of the outside band clamps of couplings 321 and 326, as shown in FIGS. 13 and 19. The tie rods 402 are bolted directly to the end plates, in tension. In the disclosed embodiment, three tie rods are equally spaced about the circumference of the end plate, as shown in FIG. 12. The opposed ends of the tie rods are threaded to receive a threaded nut 404 which tensions the rods, as described hereinbelow. Each of the center couplings 322 and 324 includes three angularly spaced tie rod brackets 372, as shown in FIGS. 14 and 16, which receive the opposed ends of the tie rods bolted to the end plates 394. A nut 406 is threadedly received on the end of the tie rod and the tie rods are tensioned to radially and axially compress the elastomeric sleeves, as described above. The tie rods 408 are tensioned between the middle couplings 322 and 324, as shown in FIG. 10. The opposed ends of the tie rods 408 are received in the tie rod clamps 372, as shown in FIGS. 10, 14 and 16. As described above, the oppositely extending tie rods 402 and 408 thus radially and axially compress the sleeves to securely retain the glass or ceramic pipe sections and prevent any leakage, regardless of whether the pipe sections include a beaded end or are saw-cut. It will be noted that the disclosed arrangement draws the saw-cut ends of the pipe sections 314 and 316 together and the saw cut end of the pipe section 316 toward the beaded end of the pipe section 318, as described in the preferred embodiment above.

Figure 11:
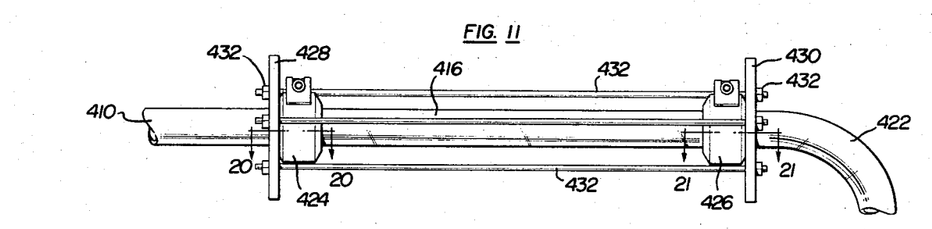
FIG. 11 is a longitudinal side view of another embodiment of a pipe coupling system utilizing the described invention.
Figure 20:
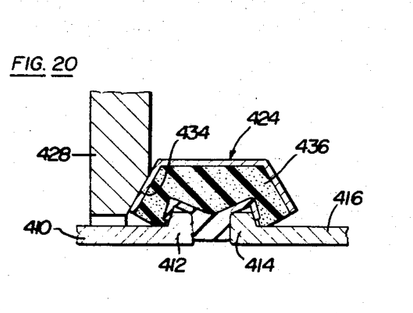
FIG. 20 is a cross-sectional view of the pipe coupling system shown in FIG. 11, in the direction of view arrows 20—20.
Figure 21:
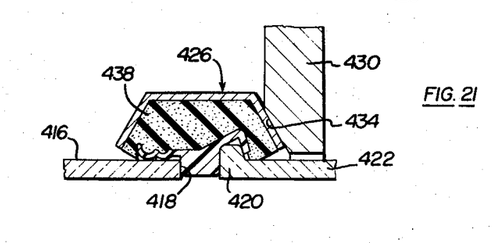
FIG. 21 is a cross-sectional view of the pipe coupling system shown in FIG. 11, in the direction of view arrows 21—21.

The embodiment of the pipe coupling system shown in FIGS. 11, 20 and 21 is similar to the pipe coupling system shown in FIG. 10, except that only three pipe sections are joined, eliminating the requirement of tie rod clamps or brackets on the bead clamp. The first pipe section 410 has a beaded end 412 which is to be joined to the beaded end 414 of the second pipe section 416, as shown in FIG. 20. The opposed end 418 of the pipe section 416 has a square or saw-cut end, which is to be joined to the beaded end 420 of the pipe section 422. The couplings 424 and 426 may be identical to the couplings shown and described in FIGS. 19 and 17, respectively, except that the band clamp does not include tie rod brackets, as described above. The end plates 428 and 430 receive and secure the tie rods 432, as described hereinbelow. The opposed ends of the tie rods are received through three equally spaced apertures in the end plates 428 and 430 and are tensioned in place by the nuts 432, as described above. The bevelled edges 434 of the end plates bear against the angular sides of the band clamps to radially and axially compress the resilient sleeves 436 and 438, as described above.

It will be evident from the foregoing description in conjunction with the appended drawings that the invention provides an improved, highly efficient pipe coupling system, particularly adaptable for coupling and sealing adjoining ends of pipes used in the chemical processing industry. The improved pipe couplings system of the present invention provides sufficient flexibility at the pipe joint to permit center-line misalignment between the adjoining pipes and to accommodate slight differences in diameters or out-of-round conditions of the pipe ends without sacrificing the excellent sealing and gripping characteristic of the improved pipe coupling system.

The present improved pipe coupling system permits quick assembly and flexibility in installation and maintenance and is similarly effectively adaptable to join beaded or unbeaded pipe ends.

The internal seal of the present improved pipe coupling system is preferably made of a synthetic material having high wear and corrosion resistant properties, and which is able to withstand high operating temperatures and pressures.

The present improved pipe coupling system is substantially impervious to corrosion and is highly resistant to thermal shocks and abrasive wear and is able to withstand high mechanical stresses encountered under extreme fluid pressure conditions causing fluctuations throughout the pipes.

The present invention may be embodied in certain other forms without departing from the spirit and essential characteristics thereof; therefore, the present embodiments are to be considered in all respects as illustrative only and not restrictive, the scope of the invention being indicated by the appended claims rather than by the foregoing description.

I claim:

1. A pipe coupling, comprising, in combination: two generally coaxially aligned pipe sections each having relatively smooth external surfaces and a pipe coupling for uniting said pipe sections, said pipe coupling including a deformable sealing gasket having an inwardly projecting annular flange disposed between the abutting pipe ends in sealing contact with the end faces thereof, and axially adjacent surfaces telescopically enclosing the exterior surfaces of said abutting pipe ends, a cylindrical sleeve of molded elastomeric material, said sleeve having a central portion circumferentially enclosing said sealing gasket and opposed cylindrical end portions in sealing engagement with the external surfaces of said pipe sections, spaced from said abutting ends, at least one of said sleeve end portions having a plurality of radial slots providing a plurality of non-molded raw cut interior circumferential edges, axially spaced from one another, in compression with the smooth external surfaces of the pipe section to increase the frictional sealing engagement of said sleeve, an exterior strap member peripherally enclosing said sleeve, said strap member having an interior peripheral surface bridging said abutting pipe ends and terminating in angularly directed compression surfaces, and means tightening said strap member onto said sleeve, radially and axially compressing said sleeve in a tight frictional engagement with said abutting pipe ends and said sealing gasket, retaining said pipe ends in sealing contact with said sealing gasket and said strap member including a plurality of brackets substantially equally angularly spaced about the circumference of said strap member, each bracket having two apertures, each aperture having an axis substantially parallel to the axis of said strap member.

2. The pipe coupling defined in claim 1, characterized in that said annular flange of the sealing gasket is solid and generally rectangular in cross section.

3. The pipe coupling defined in claim 1, characterized in that both of the opposed ends of said cylindrical sleeve include said radial slots to provide frictional sealing engagement on both sides of said sealing gasket.

4. The pipe coupling defined in claim 1, characterized in that at least one of said abutting pipe ends is provided with a radially enlarged bead portion and at least one side of said sealing gasket includes a radially enlarged flange disposed at generally a right angle, the inner surface of said right angled flange engaging the opposed sides of said enlarged bead portion of said one pipe end, and the sleeve being recessed to receive said flange to cause the sleeve and the exterior strap member to urge the tubular sealing member into sealing engagement with the bead portion of said one pipe end.

5. The pipe coupling defined in claim 1, characterized by said brackets each including a pair of spaced upstanding ears, each of said ears defining one of said apertures.

6. The pipe coupling defined in claim 5, characterized in that said ears overlap the axial center of said strap member.

7. The pipe coupling defined in claim 5, characterized in that at least one of said pairs of ears each includes a tie rod received and secured within said aperture by a threaded fastener.

8. A pipe coupling system retaining in sealed communication a plurality of pipes having smooth external surfaces, comprising, in combination, at least three axially aligned pipes, a coupling joining the confronting ends of said pipes, said coupling including an elastomeric annular sleeve telescopically receiving and enclosing said confronting pipe ends in peripheral frictional engagement with the external surfaces of said pipes and a generally cylindrical strap peripherally enclosing said sleeve, said strap having a mid-portion bridging said confronting pipe ends and tapered toward said pipe at its ends to substantially enclose said elastomeric sleeves and said straps tensioned around said sleeves to radially compress said sleeves against the exterior surface of said pipes and a tie rod assembly interconnecting said couplings, including a plurality of equally circumferentially spaced tie rods tensioned between and fixed relative to said couplings to resist any forces tending to separate said pipes and to distribute such forces over the combined area of contact between the sleeves and exterior pipe surfaces.

9. The pipe coupling system defined in claim 8, characterized in that said tie rod assembly includes a plurality of said equally circumferentially spaced tie rods tensioned between said coupling straps and a fixed element, said tie rods extending parallel to the axis of said pipes.

10. The pipe coupling system defined in claim 8, characterized in that said coupling straps each include a plurality of equally circumferentially spaced brackets, each bracket having two apertures to receive and secure said tie rods, the axis of said apertures being generally parallel to the axis of said pipes.

11. The pipe coupling system defined in claim 8, characterized in that each of said couplings has an intersealing member, including a flange portion extending between said confronting pipe ends and a pair of oppositely extending cylindrical portions extending between said external surface of the pipes and said elastomeric annular sleeve.

12. The pipe coupling system defined in claim 8, including a pair of bearing members bearing against the outside end of adjacent coupling straps, said bearing members having a tapered annular edge conforming to and bearing against the opposed outside tapered ends of said adjacent coupling straps and said tie rods secured to and tensioned between said bearing members to prevent separation of the pipes secured in sealing relation by said coupling.

13. The pipe coupling system defined in claim 8, including at least four pipes and three couplings joining the pipes at sealed relation, a pair of bearing members located on opposite sides of the two outer couplings and bearing against the coupling straps, the inner couplings having a plurality of equally circumferentially spaced tie rod brackets, each bracket having a pair of spaced apertures, said tie rod assembly including a plurality of tie rods secured at one end to one of said bearing members and secured at the opposite end to one of said brackets.

14. The pipe coupling system defined in claim 13, including two of said inner couplings and said tie rod assemblies including a plurality of tie rods secured between said inner couplings by said brackets and tensioned therebetween.

* * * * *